No. 775,472. PATENTED NOV. 22, 1904.
H. JONE.
METHOD OF CONVERTING THE ENERGY OF FUEL INTO ELECTRICAL ENERGY.
APPLICATION FILED NOV. 18, 1901.
NO MODEL.
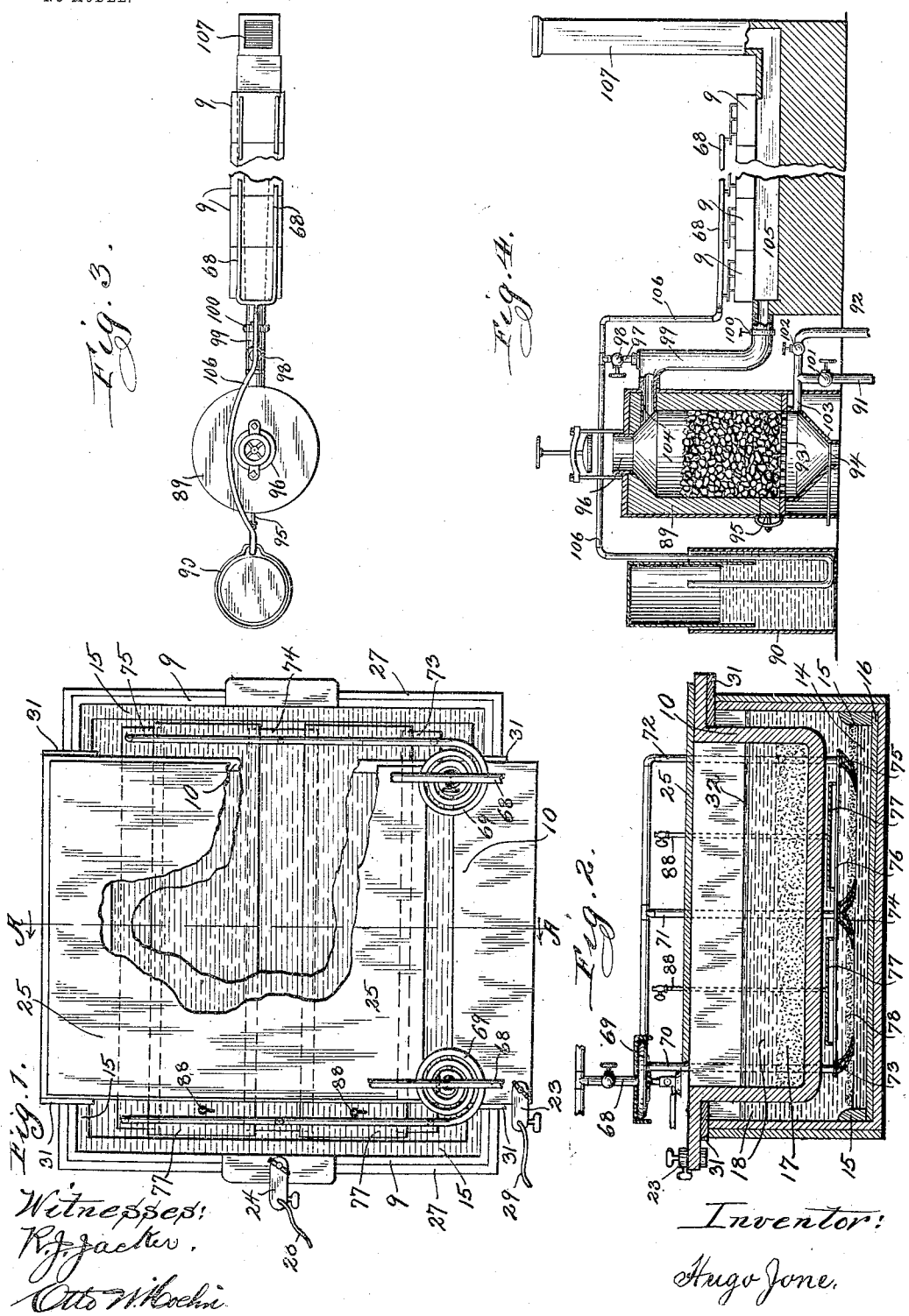
Witnesses:
R. J. Jacker.
Otto N. Boehm.
Inventor:
Hugo Jone.

No. 775,472.

Patented November 22, 1904.

UNITED STATES PATENT OFFICE.

HUGO JONE, OF CHICAGO, ILLINOIS.

METHOD OF CONVERTING THE ENERGY OF FUEL INTO ELECTRICAL ENERGY.

SPECIFICATION forming part of Letters Patent No. 775,472, dated November 22, 1904.

Application filed November 18, 1901. Serial No. 82,635. (No model.)

*To all whom it may concern:*

Be it known that I, HUGO JONE, a citizen of the United States, residing in Chicago, in the county of Cook and State of Illinois, have invented a new and useful Improvement in Methods of Converting the Energy of Fuel into Electrical Energy, of which the following is a specification.

This invention relates to methods of reducing electrical energy from fuel.

By "fuel" is meant any kind of combustible substance which is capable of reducing the oxid of some such metal as tin to the metal when heated with it, therefore particularly the several kinds of carbon, pure and impure, the carbon compounds which are capable of effecting that reduction, and any gas which may be obtained from solid or liquid fuel by heating it with steam, as in the manufacture of water-gas, or with carbon dioxid or some similar substance. In any case the substance from which the electrical energy is generated is either the fuel itself or a substance reduced by the fuel.

The invention consists, substantially, in producing an electric current in a galvanic cell, using a metal as the positive plate and carbon as the negative plate at an elevated temperature and then reducing the metallic compound formed by the oxidation of the metal in the battery reaction by means of the oxidation energy of carbonaceous fuel.

The carbon electrode is an important means for the production of a strong current. It gives a much stronger current than most metals used as cathode. This I attribute largely to the position of carbon in the electrical-tension series of metals, which makes it possible to obtain a comparatively high electromotive force even with those metals which are but feebly electropositive, as the positive plate. How important an advantage this is will be more readily understood if it is considered that it is just the feebly-electropositive metals which afford a high yield in the reduction by carbonaceous fuel. The elevated temperature serves chiefly the purpose of obtaining a high-current strength. By employing a carbon cathode at an elevated temperature it is made possible to obtain from a metal which is but moderately electropositive a current of both a comparatively high pressure and a comparatively high strength.

Another feature of the invention consists in effecting the reduction of the battery product of the cell, which serves to recover the substance by the oxidation of which the electric current is generated in the cell itself and not in any special retort provided for that purpose and separate from the cell. In other words, the cell and the reduction-retort are one and the same vessel, so that transference of chemicals from one to the other is obviated, and the reduction, as well the oxidation, is continuous. These two effects are two of the objects of this invention. If the reduction is one which takes place at an elevated temperature and the battery reaction is one which takes place only at an elevated temperature or more rapidly at that temperature, an additional benefit accrues from the combination of the reduction-retort and the cell into one and the same vessel—namely, that of saving fuel—since the two vessels need no longer be heated separately, but may be heated jointly, they being one and the same vessel. This saving of fuel, then, is another object of this invention in cases where the cell is operated at an elevated temperature. Furthermore, as neither the oxidation nor the reduction need be interrupted for the purpose of removing chemicals the cooling down of the vessels in which these reactions take place ordinarily, which is connected with such interruption, and therefore the loss of heat connected with such interruption, is avoided.

Still another object of this invention is to have the electric current as strong as possible and as constant as possible. To accomplish this, an effective depolarizer is provided, consisting not merely of atmospheric oxygen, but of a compound which is capable of deoxidation.

There are several other objects which will become apparent hereinafter.

That form of the invention which will serve as an illustration of the invention hereinafter consists, substantially, in generating electrical energy by combining metallic tin as the positive plate, caustic potash as the electrolyte, and mercuric oxid as the depolarizer in a galvanic cell, heating the cell, reducing the oxid of tin formed in the battery reaction to metallic tin by means of fuel-gas passed into the cell, and then repeating the oxidation of the tin with generation of electrical energy. The mercuric oxid is reduced to mercurous oxid or metallic mercury. From either or both the mercuric oxid is recovered by treatment with nitric acid and subsequent breaking up of the nitrate formed by ignition. If a large cell or a battery of several cells can be combined with a generator for fuel-gas in the same plant, the hot waste gases from such a generator are used to heat the battery or cell. In the accompanying drawings I have shown an illustrative form of such a plant. It consists, substantially, of a generator for water-gas, a gasometer for the water-gas generated, a battery of cells, and a flue below the battery carrying the hot waste gases of the generator. One of the cells is shown separately on a larger scale and in detail.

Referring to the drawings, and to the various views and reference-signs appearing thereon, Figure 1 is a top plan view of one of the cells with its upper part partly removed. Fig. 2 is a vertical section of the same cell on line A A of Fig. 1. Fig. 3 is a top plan view of the entire plant with a section of the battery and a corresponding section of the flue below the battery omitted. Fig. 4 is a vertical section, partly in elevation, of the same plant with a corresponding omission.

The same reference-sign designates the same part wherever it occurs in the several views.

The galvanic cells, one of which is shown in Fig. 1 and Fig. 2, consists, substantially, of a vessel 9, preferably square in shape, upon which rests, by means of a flange, a square vessel of porous carbon 10. This vessel of porous carbon contains the depolarizer—the mercuric oxid 17—and serves to retain this oxid and the mercurous oxid 17, formed from it by deoxidation, so that they cannot enter the space below, which is the anode-space. At the same time this vessel of porous carbon serves as the negative plate. Vessel 9 is made of some material that is chemically unaffected by caustic potash. Upon the bottom is placed an iron plate 16, provided with a ledge 15, running along its edge and constituting with the plate a flat pan. The ledge is made of some material which is chemically unaffected by caustic alkalies, alkaline carbonates, and by molten metallic tin. The flat pan serves as a receptacle for the tin, either solid or molten, preferably the latter. The tin constitutes the positive plate by the oxidation of which the current is generated. The tin is in electric contact with wire 28 through clamp 24, the metal of the vessel 9, and the iron plate 16. The negative plate 10 is in electric contact with wire 29 through clamp 23. The fluid 18 shown in vessel 9 and in vessel 10 is a concentrated watery solution of caustic potash. This solution is covered by a layer of paraffin 32 to prevent absorption of carbon dioxid and of oxygen from the air. Vessel 9 is protected against loss of much heat by being covered on the sides and on top by thick sheets of asbestos 27 26 25. A strip of electric insulating material 31, such as asbestos or marble, is placed below the flanges of the carbon vessel 10, where it rests on vessel 9. The electric current is obtained between wires 29 and 28.

The gas, which serves as reducing agent, is supplied to the cell through pipes 68, is heated in coils 69, and distributed through pipes 70 71 72, which are each provided with a suitable jet 73 74 75, through which the gas is delivered into the liquid in the cell, preferably near the surface of the tin, so as to reduce not merely the oxid of tin 78 in solution as stannite, but also that which is undissolved. The number of the distributing-pipes need not necessarily be three. It varies with the size of the battery. The shape of the jets is preferably one which will cause the gas if it is under sufficient pressure to sweep along the surface of the tin and come in contact with as much oxid of tin 78 as possible. Those shown in the drawings have the openings through which they deliver along their lower edge in the form of a fine slit or a series of small holes. The several pipes and jets are made of enameled metal, preferably enameled copper. The enamel consists, preferably, of an insoluble borate. The coils 69 may be covered by a hood of asbestos, as shown in Fig. 2, so as to reduce the loss of heat. The gas which rises in the liquid before being oxidized accumulates in the inverted pans 77, which rest on a strip of enameled iron 76. This is in turn supported by the pipes 73 74 75. The pans 77 are provided with a pipe each, 88, reaching above the surface of the liquid and provided with a valve which permits the draining out of the gas in the pans.

To start the generation of electrical energy, the battery is heated to a temperature sufficiently high to effect the reduction of the tin compound formed in the battery reaction by means of hot fuel-gas. How high that temperature is depends, evidently, upon the nature and the temperature of the hot fuel-gas. The caustic potash and the mercuric oxid act on the metallic tin, oxidizing it with production of an electric current, the oxygen being supplied by the mercuric oxid, which is thereby reduced to mercurous oxid, or, if there is insufficient supply of it, to metallic mercury, as follows:

$$Sn + KOH + H_2O + 2HgO = SnO + KOH + H_2O + Hg_2O.$$

This reaction may be considered as consisting of the following two reactions if the fact is ignored that the hydrogen is oxidized in the nascent state and not liberated as such if there is proper electrolytic action:

$$Sn + KOH + H_2O = SnO + KOH + 2H.$$

$$2H + 2HgO = H_2O + Hg_2O.$$

In case of insufficient supply of mercuric oxid the last reaction may be modified, as follows:

$$2H + HgO = H_2O + Hg.$$

The stannous oxid formed in the battery reaction is partly dissolved as stannite of potassium, thus:

$$SnO + 2KOH = K_2SnO_2 + H_2O.$$

The stannite of potassium and the undissolved stannous oxid are reduced by heating coils 69 and opening after the coils have attained a bright red heat, which is somewhat higher than sufficient for the desired reduction, the valve which closes supply-pipe 68. The reducing-gas, which in this case is water-gas, being kept under gasometer-pressure or other suitable pressure, passes through the coils, is heated to nearly the temperature of the coils, is delivered into the liquid through the distributing-pipes and the jets, and reduces the stannous oxid, as follows:

$$CO + SnO = CO_2 + Sn.$$

$$2H + SnO = H_2O + Sn.$$

$$CH_4 + 4SnO = CO_2 + 2H_2O + 4Sn.$$

It will be noticed that the gases whose reactions with stannous oxid are represented by these equations are the principal constituents of water-gas—namely, carbon monoxid, hydrogen, and marsh-gas. The metallic tin is thus recovered and the generation of electrical energy continued uninterruptedly. The electromotive force of a cell of this kind is 1.03 volts. The current strength of a cell of the described form and of the capacity of one gallon of liquid is 12.0 amperes when the external resistance is .04 ohm. The mercurous oxid obtained by the battery reaction in vessel 10 is allowed to accumulate until nearly the whole of the mercuric oxid is converted into mercurous oxid. Then the mixture of the two oxids is removed by suitable means and a suitable quantity of mercuric oxid put in its place. The mixture of the two oxids of mercury is heated with concentrated nitric acid, so as to convert both oxids into mercuric nitrate, thus:

$$Hg_2O + 6HNO_3 = 2Hg(NO_3)_2 + 2NO_2 + 3H_2O.$$

$$HgO + 2HNO_3 = Hg(NO_3)_2 + H_2O.$$

The mercuric nitrate thus obtained is heated until it breaks up, as follows:

$$Hg(NO_3)_2 = HgO + 2NO_2 + O.$$

The mercuric oxid is thus recovered and may again be supplied to the cell.

The water-gas is generated in the generator 89. (Shown in Fig. 3 and Fig. 4.) This vessel is made of iron lined with fire-bricks. It is provided with a grate 93, on which the carbonaceous fuel, preferably coal, rests, a valve 94 for the removal of ashes, a manhole 95, an aperture at the top 96, an inlet-pipe 103, dividing into two branches, one of which, 91, carries compressed air, and the other, 92, carries steam, and which can be closed by valves 101 and 102, respectively, an outlet-pipe 104, which also divides into two branches 97 and 99, which can be closed by valves 98 and 100, respectively. Branch pipe 97 communicates simultaneously, through pipe 106, with gasometer 90 and with the supply-pipes 68 of the cells 9. Branch pipe 99 communicates, through flue 105, with smoke-stack 107.

The generation of the gas is carried on in essentially the same manner as water-gas is generally made, except that the impregnation of the gas with hydrocarbons is preferably omitted. The coal is ignited near the grate. Compressed air is blown into the generator by opening valves 101 and 100. The coal is thus heated to incandescence. When a temperature sufficiently high for the decomposition of steam is reached, valves 101 and 100 are closed and valves 102 and 98 are opened. The following reactions take place:

$$C + 2H_2O = CO_2 + 4H.$$

$$C + CO_2 = 2CO.$$

Hydrogen and carbon monoxid are thus obtained. As marsh-gas and other hydrocarbons are apt to be generated by the action of heat upon the coal, a mixture consisting chiefly of hydrogen, carbon monoxid, and marsh-gas is obtained. This gas mixture is stored in gasometer 90, by the pressure of which it is supplied uniformly to the cells 9, where it effects the reduction of oxid of tin to metallic tin, as described hereinabove. The hot gases issuing from generator 89 when compressed air is turned in through pipe 91 are allowed to pass through flue 105 and to heat the cells 9. Thus heat and reducing-gas supplied to the cells, which in combination with the regeneration of the mercuric oxid afford the continued production of electrical energy.

The apparatus need not be made exactly as described. Changes may be made which do not materially affect the chemical reactions or the production of electrical energy. The number of cells, for instance, or the ratio between the height and the length of the cells or the shape of the several vessels may be varied. The apparatus described is merely an illustrative embodiment of the kind of apparatus used.

The reducing agent need not necessarily be a gas. It may be a solid or a liquid. Potassium formate (KHCO_2) may be added either solid or in solution. The reducing effect is about the same as when carbon monoxid is passed through the electrolyte, since potassium formate at a temperature of about 260° centigrade breaks up into carbon monoxid and potassium hydroxid, thus:

$$KHCO_2 = CO + KHO.$$

Furthermore, if the battery is kept at a temperature between 150° centigrade and 200° centigrade potassium formate may be obtained by the action of carbon monoxid on the caustic potash in the cell, thus:

$$CO + KHO = KHCO_2.$$

It is thus evident that either substance may be substituted for the other. The gas, (carbon monoxid,) however, is preferred because it can be supplied and heated more conveniently.

The electrolyte need not necessarily be alkaline. It may be acid or neutral, the essential feature of this invention regarding the reduction being the reduction of the battery product within this cell by means of gaseous, liquid, or solid fuel. As many metallic salts which are reduced by carbon monoxid or hydrogen are capable of producing an electric current by subsequent oxidation of the reduction product, they may be combined with a suitable oxidant in a galvanic cell in which both the oxidation and the reduction take place. Ferrous sulfate, for instance, dissolved in dilute sulfuric acid may be combined with nitric acid in a galvanic cell and the resulting ferric sulfate reduced by passing a fuel-gas, such as carbon monoxid or hydrogen, through it. Alkaline electrolytes, however, are preferred, because they do not evaporate at as low a temperature as the acids in acid electrolytes, because they do not corrode the cells as much as the acids if they are made of some such material as enameled iron, because most reductions can be effected more easily in alkaline than in acid solution, because the alkali is not, unlike the acids in many cases, reduced along with the oxid dissolved in it, and for the other reasons which are known to make an alkaline electrolyte desirable. The example given to illustrate the use of an acid electrolyte (ferrous sulfate in dilute sulfuric acid) also illustrates the fact that the substance by the oxidation of which the electric current is produced need not necessarily be a metal, but that it may be a product of the reduction of a metallic salt when that reduction is not carried so far as to the isolation of the metal. The reduction can be effected within such a cell, as has been shown.

In order to obtain the reduction products which are capable of producing a strong electric current, the reduction is preferably carried on at an elevated temperature, it being a fact that most reductions whose products are strongly electropositive require a high temperature. The elevated temperature at the same time serves another purpose—namely, that of making the oxidation, and therefore the production, of an electric current, more rapid. By promoting the oxidation of a metal which is but moderately electropositive the elevated temperature makes possible a high yield. In the cold the tin would give but a feeble current, if any at all, and a more strongly electropositive metal would have to be used in order to obtain a strong current. This would necessitate a greater loss of heat in the reduction of the metallic compound formed from the metal, since strongly-electropositive metals require comparatively high temperatures for reduction. It is this loss which is largely avoided by an elevated temperature.

Besides the advantages arising from effecting the reduction in the cell and those arising from effecting it at an elevated temperature there are those resulting from the use of a gaseous reducing agent. A great many cells can be supplied with the gaseous reducing agent almost as easily as one cell, since the gas if placed under suitable pressure will flow to all of them simultaneously and uniformly, while a solid reducing agent requires more complex manipulation for its transference to many cells. Furthermore, as a gas generated from fuel, such as coal, by dry distillation or by treatment with water or with carbon dioxid leaves behind those substances which would seriously contaminate the electrolyte and eventually necessitate its renewal it is much to be preferred to solid reducing agents so long as these are not pure, as is the case with coal, for instance. Another important advantage afforded by gas is the ease with which it may be heated previous to passing into the cell for the purpose of effecting reduction at a high temperature, while a solid, such as a lump of coal, would not only cause difficulty in its transmission if transmitted hot, but would be apt to cool down in a cell to a temperature at which it no longer effects the desired reduction, for the reason that a large lump of such a solid cannot be used up in the reduction at once. It is the gradual and regular supply of the gas which makes possible reductions that take place at about 600° centigrade in a watery solution of caustic potash boiling at 340° centigrade without evaporation or without rapid evaporation of the water. The gas being supplied only in such quantities as can be oxidized instantly is still hot when the reduction is to take place, unlike the larger part of the lump of coal referred to. The boiling of the solution may be prevented by passing the gas into the solution considerably below the surface, so that the steam which may be formed condenses again before it reaches the surface. The steam can form only gradually, owing to the gradual supply of the gas. Thus it is possible to maintain a high temperature at the particular place where the reduction takes place, while the rest of the solution is at a much lower temperature. The heat supplied by the hot gas is to be used either exclusively or along with other sources of heat for maintaining the elevated temperature of the liquid, since if the other sources of heat alone are sufficient to maintain a temperature approaching the boiling-point of the liquid the additional heat supplied by the gas may raise the temperature above the boiling-point of the liquid and cause the loss of water. This loss is to be avoided, because the production of a strong electric current is much more difficult without than with water in the electrolyte. The water then is either to be prevented from boiling away or else is supplied again in proportion as it boils away. The object in heating the reducing agent besides the solution instead of heating the solution alone is evidently also that of preventing the solution from boiling. Another reason why certain gases are to be preferred to coal and other similar combustible solids is the fact that such fuel-gases as carbon monoxid, hydrogen, and marsh-gas effect most reductions at a lower temperature than carbon, owing to the lower point of ignition. This fact aids evidently in preventing the boiling of the solution. It is desirable for still another reason to maintain the larger part of this cell at as low a temperature as possible. The loss of heat would evidently be greater with a high temperature. Those devices then which afford a comparatively low temperature of the electrolyte aid in reducing the loss of heat.

The heating of the pipes carrying the gaseous reducing agent is accomplished, preferably, by applying a gas-flame, since that is convenient and does not lead to the formation of soot, it being easy to effect a complete combustion of fuel-gas by means of a suitable burner.

The efficiency of the water-gas plant is higher than that of an ordinary water-gas plant, since the heat lost by those vessels in which the water-gas is impregnated with hydrocarbons is not lost at all in this case, this addition of hydrocarbons for the purpose of making the flame of the gas luminous, and therefore also the vessels used for that purpose, being unnecessary in this case. The heat which would be lost in operating the generator is largely utilized, since the hot gases issuing from it when the coal is burned in air are made to heat the battery.

The gas used for the reduction need not necessarily be water-gas. It may be any of its constituent reducing gases, carbon monoxid, hydrogen, marsh-gas, or any other reducing gas representing the energy of fuel and obtainable by treatment of fuel with suitable substances which can be reduced by the fuel. The water-gas plant, for instance, could with some slight modifications easily be replaced by a carbon-monoxid plant, in which carbon monoxid would be generated by treatment of incandescent coal with carbon dioxid. It could also be replaced by a plant producing benzin-vapor from liquid benzin.

A special advantage consists in that the cell may be stopped easily by simply lowering the temperature. The stoppage of the current may also be brought about by discontinuing the supply of gas. In this case the tin is gradually covered by a film of oxid, which retards and finally almost entirely stops the battery reaction.

The energetic battery reaction is largely accounted for by the acid properties of the oxid of tin, since even the more electropositive metal which has no acid properties would dissolve in alkali less rapidly or not at all. It is indeed, to a large extent at least, the use of an acid form in metal in connection with alkali which affords a strong current without necessitating a difficult reduction—namely, that of a strongly electropositive metal. Although there are several other easily reducible metals which are capable of acting as an acid toward alkali—for instance, lead, antimony, and arsenic—and which therefore react rapidly with alkali, the use of which as electrolyte is very desirable for its many advantages, the tin excels in rapid reaction with alkali. Cadmium may also be substituted for tin. However, tin is preferred, as it reacts more rapidly with a hot solution of caustic alkali than cadmium does. The fact that its reaction with hot alkali is accompanied by formation of hydrogen seems to account largely for the strong electric current it produces in the cell. I believe, indeed, that a large part of the current is due to the electrolytic oxidation of the nascent hydrogen. Considering, furthermore, the fact that tin reduces mercuric oxid under water even in the cold and without the presence of alkali, it is not surprising that the electrolytic oxidation of tin by mercuric acid in this cell is violent. This reaction, as well as the formation of hydrogen, is evidently not the only manifestation of the strong affinity of tin for oxygen. The violent oxidation of tin by nitric acid evidently also proves that affinity to be a strong one. It is not surprising that such a strong reducer makes a good positive plate in a galvanic cell, and it is fortunate that the tin can yet be reduced from its oxygen compounds with comparative ease in spite of its strong affinity for oxygen. Furthermore, it is capable of producing a comparatively high electromotive force when used as the positive plate, as is indicated by its position in the electric tension series of metals in spite of the fact that it is but a feebly basic and easily reducible metal. The difference of the temperatures at which tin decomposes water and at which its oxid is reduced to the metal is not as great as with most other metals. This is another reason why tin is preferred. If some such metal as zinc were to be reduced, the reduction plant would evidently have to be at a very high temperature, while the battery would not need to be heated at all. The hot furnace-gases would be useless, and the high temperature of the reduction plant would naturally cause considerable loss of heat, while in the case of tin the battery and the reduction plant may be kept at approximately the same temperature. This is evidently one of the circumstances which enable me to effect both the reduction and the oxidation in one and the same vessel without excessive loss of heat. The temperature of the vessel, moreover, is such that it is impossible to retain water, which is an important advantage, as shown hereinabove.

It has been asserted that no electric current at all is obtainable from carbon monoxid in that cell known as "Borcher's" cell, even in acid solution, and this is ascribed to the inefficiency of atmospheric oxygen as depolarizer. It seems, indeed, that free oxygen does not aid in the production of a current or not much unless it is previously combined with another substance, or at least observed by some such substance as spongy platinum. It will be noticed that in accordance with these circumstances I combined the oxygen of the air with mercurous oxid for the purpose of depolarization. Besides being an effective depolarizer the mercuric oxid, as well as other metallic oxids which may be used as depolarizers, offers the advantages of remaining undecomposed by the alkali and of being easily regenerated after deoxidation and without the consumption of any substance beyond atmospheric oxygen and fuel. Furthermore, it causes but little waste of energy when acting as a depolarizer. In the Edison-Lalande cell a considerable part of the oxidation energy of the zinc is wasted in breaking up the cupric oxid used as depolarizer. As the energy required to reduce mercuric oxid to mercurous oxid is only about half as much as in the case of cupric oxid for the same amount of oxygen given off, I effect considerable saving of energy by the use of mercuric oxid, as described. To the energetic oxidizing action of the mercuric oxid when acting on metals like tin or antimony I attribute the fact that the battery reaction proceeds rapidly and that the current strength is comparatively high.

This invention is intended to cover features not covered by a previous application of mine describing a similar invention entitled "Method of converting the energy of fuel into electrical energy," filed November 7, 1901, Serial No. 81,391.

By having the negative electrode in the form of a porous carbon vessel no separate porous vessel is needed to serve as a receptacle for the depolarizer. Furthermore, as the wall of the porous vessel is of a material which conducts electricity and which acts as the negative plate any mercuric oxid which might be dissolved in the alkali is apt to be reduced when in the pores of the porous vessel, so that it cannot produce local action by passing into the anode-space. Furthermore, the internal resistance is decreased by having a conductor of electricity as porous vessel in place of a non-conductor.

What I claim as new and useful, and desire to secure by Letters Patent, is as follows:

1. The method of generating electrical energy which consists in first combining an oxidizable substance which is a conductor of electricity, as the positive plate, with carbon as the negative plate and alkali as electrolyte in a galvanic cell, at an elevated temperature, generating electrical energy by oxidation of the oxidizable substance, and then reducing the battery product formed in that oxidation, to the original oxidizable substance by means of the oxidation energy of fuel, and repeating the oxidation with generation of electrical energy, as and for the purpose set forth.

2. The method of generating electrical energy which consists in first combining a metal as the positive plate, with carbon as the negative plate, and an alkali as the electrolyte, in a galvanic cell, at an elevated temperature, generating electrical energy by oxidation of the metal, and then reducing that battery product which contains the metal oxidized in the battery reaction to the metal by means of the oxidation energy of fuel, and repeating the oxidation of the metal with generation of electrical energy, as and for the purpose set forth.

3. The method of generating electrical energy which consists in first combining a metal, the oxid of which yields chiefly carbon dioxid, in addition to the metal, in its reduction by carbon, as the positive plate, with carbon as the negative plate, and alkali as electrolyte, in a galvanic cell, at an elevated temperature, generating electrical energy by oxidation of the metal, and then reducing that battery product which contains the metal oxidized in the battery reaction, to the metal by means of the oxidation energy of fuel, and repeating the oxidation of the metal with generation of electrical energy, as and for the purpose set forth.

4. The method of generating electrical energy which consists in first combining a metal, the oxid of which yields chiefly carbon dioxid, in addition to the metal, in its reduction by carbon, as the positive plate, with carbon as the negative plate, and an alkali as the electrolyte, in a galvanic cell, at an elevated temperature, generating electrical energy by oxidation of the metal, and then reducing that battery product which contains the metal oxidized in the battery reaction, to the metal by means of the oxidation energy of fuel, and repeating the oxidation of the metal with generation of electrical energy, as and for the purpose set forth.

5. The method of generating electrical energy which consists in first combining a metal, as the positive plate, with an oxidant as depolarizer, and a porous carbon vessel as the negative plate, serving at the same time as a receptacle for the depolarizer, in a galvanic cell, at an elevated temperature, generating electrical energy by oxidation of the metal, and then reducing the battery product which contains the metal oxidized in the battery reaction, to the metal by means of the oxidation energy of fuel, and repeating the oxidation of the metal with generation of electrical energy, as and for the purpose set forth.

6. The method of generating electrical energy which consists in first combining a metal, which is capable of generating hydrogen with solution of alkali as the positive plate, with carbon as the negative plate, in a galvanic cell, at an elevated temperature, generating electrical energy by oxidation of the metal, and then reducing that battery product which contains the metal oxidized in the battery reaction, to the metal by means of the oxidation energy of fuel, and repeating the oxidation of the metal with generation of electrical energy, as and for the purpose set forth.

7. The method of generating electrical energy which consists in first combining a metal, which is capable of forming a higher and a lower oxid, as the positive plate, with carbon as the negative plate, in a galvanic cell, at an elevated temperature, generating electrical energy by oxidization of the metal and with formation of the compound in which the metal has the lower valence, and then reducing that battery product which contains the metal oxidized in the battery reaction to the metal by means of the oxidation energy of fuel, and repeating the oxidation of the metal with generation of electrical energy, as and for the purpose set forth.

8. The method of generating electrical energy which consists in first combining a metal, which is capable of acting as an acid toward alkali as the positive plate, with an alkali as the electrolyte and carbon as the negative plate, in a galvanic cell, at an elevated temperature, generating electrical energy by oxidation of the metal and then reducing that battery product which contains the metal oxidized in the battery reaction, to the metal by means of the oxidation energy of carbonaceous fuel, and repeating the oxidation of the metal with generation of electrical energy, as and for the purpose set forth.

9. The method of generating electrical energy which consists in first combining metallic tin as the positive plate, with carbon as the negative plate, in a galvanic cell, at an elevated temperature, generating electrical energy by oxidation of the tin, and then reducing that battery product which contains the tin oxidized in the battery reaction to metallic tin by means of the oxidation energy of carbonaceous fuel, and repeating the oxidation of the tin with generation of electrical energy, as and for the purpose set forth.

10. The method of generating electrical energy which consists in first combining a metal, as the positive plate, with carbon as the negative plate, and a compound containing oxygen and capable of deoxidation as the depolarizer in a galvanic cell, at an elevated temperature, generating electrical energy by oxidation of the metal, and with deoxidation of the compound containing oxygen and then reducing that battery product which contains the metal oxidized in the battery reaction, to the metal by means of the oxidation energy of carbonaceous fuel, and repeating the oxidation of the metal with the generation of electrical energy, as and for the purpose set forth.

11. The method of generating electrical energy which consists in first combining a metal, as the positive plate, with carbon as the negative plate, and a metallic oxid as the depolarizer in a galvanic cell, at an elevated temperature, generating electrical energy by oxidation of the metal and with deoxidation of the metallic oxid, and then reducing that battery product which contains the metal oxidized in the battery reaction, to the metal by means of the oxidation energy of carbonaceous fuel, and repeating the oxidation of the metal with generation of electrical energy, as and for the purpose set forth.

12. The method of generating electrical energy which consists in first combining a metal as the positive plate, with carbon as the negative plate, in a galvanic cell, at an elevated temperature, generating electrical energy by oxidation of the metal and then reducing that battery product which contains the metal oxidized in the battery reaction, to the metal by introducing into the same cell a reducing agent which is the product of a reduction by carbonaceous fuel, and repeating the oxidation of the metal with generation of electrical energy, as and for the purpose set forth.

13. The method of generating electrical energy which consists in first combining a metal as the positive plate, with carbon as the negative plate, in a galvanic cell, at an elevated temperature, generating electrical energy by oxidation of the metal and then reducing that battery product which contains the metal oxidized in the battery reaction, to the metal by means of a reducing-gas which is one of the constituents of any of the fuel-gases, and repeating the oxidation of the metal with generation of electrical energy, as and for the purpose set forth.

14. The method of generating electrical energy which consists in first combining a metal as the positive plate, with carbon as the negative plate, in a galvanic cell, at an elevated temperature, generating electrical energy by oxidation of the metal and then reducing that battery product which contains the metal oxidized in the battery reaction, to the metal by introducing into the same cell a reducing-gas which is one of the constituents of any of the fuel-gases, and which has been previously heated, and repeating the oxidation of the metal with generation of electrical energy, as and for the purpose set forth.

15. The method of generating electrical energy which consists in first combining a metal as the positive plate with carbon as the negative plate, and alkali as the electrolyte, in a galvanic cell at an elevated temperature, generating electrical energy by oxidation of the metal, reducing the metallic compound formed in that oxidation, to the original metal by means of the oxidation energy of carbonaceous fuel, utilizing the waste heat given off in any of the processes subsidiary to the reduction, for heating the said galvanic cell, and repeating the oxidation with generation of electrical energy, as and for the purpose set forth.

HUGO JONE.

Witnesses:
MARY F. LINCOLN,
EVA B. JUDD.